ASYNCHRONOUS PAPER TAPE READER

Filed April 12, 1965

INVENTOR
JOHN PAUL JONES, JR.

BY Watson, Cole, Grindle & Watson
ATTORNEYS

United States Patent Office 3,448,249

Patented June 3, 1969

3,448,249

ASYNCHRONOUS PAPER TAPE READER

John Paul Jones, Jr., Wynnewood, Pa., assignor to Navigation Computer Corporation, a corporation of Pennsylvania Filed Apr. 12, 1965, Ser. No. 447,381
Int. Cl. G06k 19/00
U.S. Cl. 235—61.11 11 Claims

ABSTRACT OF THE DISCLOSURE

A punch paper tape reader uses an electromagnetic armature to operate a pawl-ratchet paper advance mechanism by means of a spring link member coupling the armature to the pawl to store energy for advance after the armature is closed. The tape holes are sensed by movable pins which operate an electrical circuit to indicate punched holes, either by moving switch contacts or by placing a shutter in a photoelectric circuit.

This invention relates to a punched tape processor, and more particularly it relates to asynchronous step-by-step tape readers.

Operating requirements of a desirable tape reader are many. For reading reliability, particularly punched holes must be read as well as chadless tape, and dirt or paper particles must not interfere with output signals. Also, the tape should not be torn or worn by the reader to enable the reader to repetitively read a tape segment many times.

In order to be useful with a variety of different digital processing system requirements, a tape reader is preferably synchronizable. That is, a clock pulse from an external source should be able to time the reading action so that the reader itself operates asynchronously. Also information read from the tape should be held without destruction until replaced by the next group of information read so that it is available when called for by the external equipment.

The reader itself undergoes a series of closely timed cyclic operations. For example, it may eliminate previously stored information, advance the tape to a further reading position, sense the information at that reading position, store the information sensed for use when called for and await a further operation cycle, etc. Thus, complexity of equipment necessary to sequence and time different operational cycles has prevailed in the prior art.

The size, power used, and cost should be minimized, while the reading speed, wear and performance over a long life period of the apparatus is maximized. Generally wear is evidenced by audible noise which in itself is objectionable.

To incorporate all of these desirable features in a tape reader of the prior art has seemed impossible since many of the features appeared to be mutually inconsistent. Prior art design techniques have compromised performance and thus have failed to provide a satisfactory reader. Many readers require continuous power and have continuously moving parts which wear. Others are cyclical in operation so that the external data processing system must conform to the timing cycle within the reader. Most reader configurations are so bulky that they are not adaptable to use in restricted locations. Other sacrifice reading speed to attain the various complex functions of operation. Perhaps the most significant shortcoming is the maintenance problem of precisely adjusted mechanical and electronic readers of the prior art. Some are inaccessible and others are complex with many parts which can fail. If they are continuously operated, there is wear and aging resulting in frequent failures. Some even require external power sources such as drive shafts from which cyclic internal operations are programmed. Others require sequential digital control signals which necessitate complex peripheral equipment.

Accordingly it is an object of the invention to provide an improved tape reader which positively senses through chadless punched tape and advances the tape in precise increments.

Another object of the invention is to overcome the above prior art problems in a tape reader to incorporate various desirable features in a single embodiment.

A further object is to provide a reliably operating tape reader requiring little maintenance and having very few parts of a non-precision nature.

A more specific object of the invention is to provide a completely self-contained compact tape reader with little operating noise.

Another specific object of the invention is to provide a tape reader which will operate asynchronously at high enough speeds to find significant use in high speed data processing systems.

A still further object of the invention is to provide a self-contained reader which has a simple internal timing cycle.

Thus in accordance with the invention a step-by-step tape reader is provided for advancing punched paper tape from character to character asynchronously in response to a single input reading command to a single solenoid control winding. This self-contained reader senses the punched positions on the tape to provide static output signals from tape C relay contacts during substantially the entire interval between tape advancing operations. It incorporates new operational principles such that speeds of fifty tape steps per second are readily attainable with electromagnetic circuits formerly operating significantly more slowly. A very compact unit is provided with only a few movable parts which interrelate in a simplified and reliable automatic timing sequence of sub-operational steps for retracting sensing pins from the tape, advancing the tape and resensing in a static storage position while awaiting a further read command signal.

The structural features of the invention together with its mode of operation and further features are described with reference to the accompanying drawings, wherein.

Figure 1:
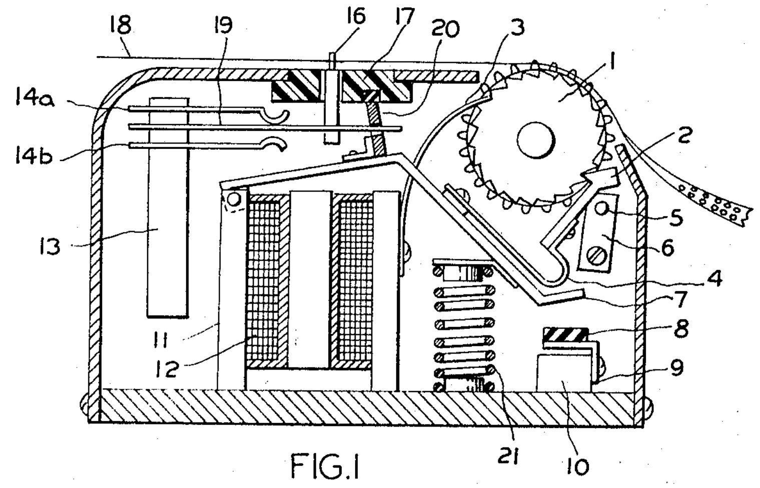
FIGURE 1 is a side view partly in section of a punched tape reader embodiment of the invention.

Punched paper tape 18 is engaged and advanced in step-by-step fashion along a predetermined path by sprockets on cylinder 1, which has integrally affixed ratchet teeth for mating with the pawl 2 for step-by-step advancement of the tape 18 past a reading station 17. The pawl has a leaf spring assembly 4 which is reciprocated by action of driver arm or armature 7 of solenoid core 11 movable under control of winding 12.

Reading is accomplished without parts wear by means of pins 16 formed of a plastic such as "Delrin" floated upon or integrally mounted for movement with the spring wire contact arms 19, which engage C type contacts 14A and 14B for static electric readout dependent upon the presence or absence of a hole in tape 18. The plastic insulating contact mounting block 13 holds a set of contact arms for external wiring. Thus, in a standard reader such as shown eight banks of sensing pins 16 are provided looking into the drawing with corresponding switch sets distributed over a one inch platen to handle standard one inch eight hole punched paper tape. This gives a concept of the overall size of the reader which is fully contained in the assembly shown.

Pins 16 are guided loosely through block 17 to sense the tape, which may be held down by a spring loaded tape retainer clip (not shown), as the pins are held in the upward position by the spring bias of contact wire spring 19. Thus the sensing pins 16 gently are forced by relay contact spring 19, individually to either poke through a punched hole or remain in retracted position as held down by the tape. Simultaneously the contact wire spring attains a position in electrical contact with one of the supplemental relay contacts 14A or 14B to produce the appropriate output signal connection. The cage block 20 has an aperture containing spring 19 loosely enough to attain the two reading positions in the upward limiting position shown, but pulling the pins 16 away from the tape to permit it to advance whenever the solenoid 12 is energized moving the driver arm 7 downward, where the lower contacts 14B are engaged by spring contact wire 19.

Stop or detent 3 restricts motion of the sprocket wheel 1, which is properly ratcheted into an irreversible position by pawl member 2 as the driver arm 7 is moved downward. A urethane bumper pad 8 serves as a forward buffer noise absorbing stop for the armature 7 and prevents complete closure of the magnetic pole pieces of core 11. A fine adjustment of the closure gap is afforded by the screw 9 holding stop pad 8 on the holding block 10.

Figure 2:
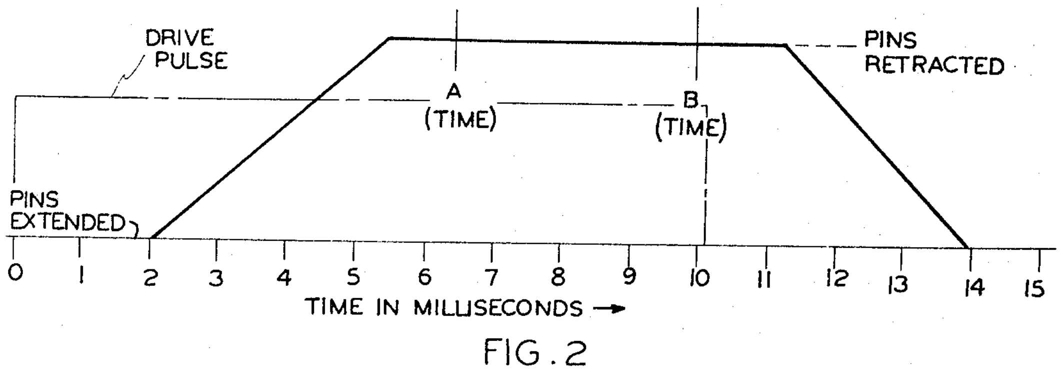
FIGURE 2 is a timing waveform illustrating operation of the reader in accordance with the principles of the invention.

With reference to the timing diagram of FIGURE 2, notice that the sense pins 16 may be retracted and completely cleared of the paper tape 18 before the movement of the sprocket 1 can begin to transport the paper tape forward. This requires a delay means, which is provided by the leaf spring 4, as shown in the sequence in FIGURES 3 and 4.

Figure 3:
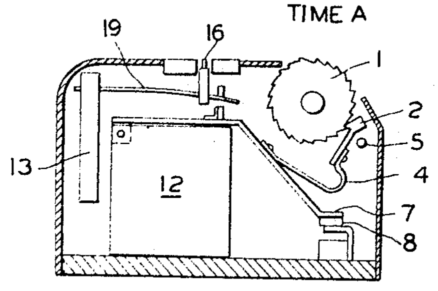
FIGURES 3 and 4 are respective side views of the tape reader illustrating operating positions A and B corresponding to times on the waveform of FIGURE 2.

Notice that FIGURE 1 shows the complete assembly at rest, before the cycle begins. FIGURE 3 shows the point in the operational cycle that is designated point A on the timing chart in FIGURE 2. At this point in the cycle, the drive arm 7 has been pulled down against the stop pad 8 and all of the pins have been retracted by the cage block 20 which is mounted directly to the driver arm 7. At this exact point in time, the sprocket cylinder 1 and pawl 2 still remain essentially in the START position because of the inertia of the sprocket-ratchet wheel combination, and the paper tape. The leaf drive spring 4 affixed to armature 7 and pawl 2 is "cocked" at this point and exerting full drive power on the tape. Note here that the drive on the tape comes only from spring 4 and thus will remain constant regardless of the drive characteristics of the solenoid coil at either "high line voltage" or "low line voltage" in system operation. This constant drive characteristics is important when the reader is incorporated with spooling or feed mechanisms which must be "set" with a given amount of tension for proper follow-up.

Figure 4:
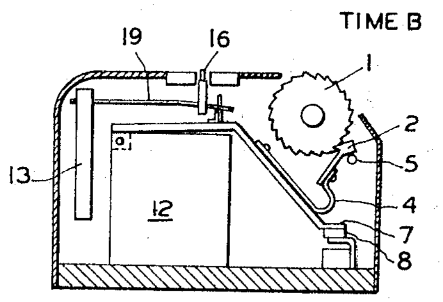

FIGURE 4 shows the state of mechanism at point B in time, as shown on the timing diagram of FIGURE 2. At this point the sprocket and ratchet assembly has had time to respond to the tension of the cocked leaf spring 4, and has allowed the drive pawl 2 to move downward until it contacts the stop pin 5 on its lower parallel surface. At this point the drive pawl, with its two parallel surfaces, is wedged between the lower side of the next tooth on the ratchet wheel and the top surface of the stop pin 5, which acts as a stop for the sprocket wheel, to prevent overshoot of the tape. It is essential that the overshoot of the sprocket assembly be limited, regardless of the drive applied to the solenoid coil 12, so that the sense pins will not brush the tape 18 when they are being returned to the upper position for sensing the hole or no-hole configuration.

After 2 to 3 millisecond pause in downward position, shown in FIGURE 4, the complete assembly of drive arm 7 and the pawl 2 and leaf spring 4 returns to the configuration shown in FIGURE 1.

Thus the tape reader herein proposed advances the paper tape in the proper sequence; by a single continuous action from a single pivot point, with a bare minimum of inexpensive and non-critical (low accuracy) parts. During the return to static position, the solenoid drive arm 7 resumes the position of FIGURE 1 by action of the return spring assembly 21. Note that the stop pin 5 is adjustable about the screw pivot position afforded on bar 6 which permits a precise control over the terminal position of pawl 2.

The basic novel principle incorporated herein is the use of a movable member operated under a single drive force action which serves to retract the pins from the tape, introduce a time delay and then draw (rather than impact) the sprocket wheel into an advanced position. The bumper 8 and slightly gapped magnetic armature reduces noise of the driving force, and the drawing of spring 4 against the sprocket wheel is also quiet thus to permit extremely quiet operation.

As seen in FIGURE 3, the delay in timing from the pulling down of pins 16 and the advancing of paper tape 18 is accomplished by use of a spring 4 which is driven with enough force to overcome inertia and advance the tape 18 by movable member 7 after the pins 16 are removed from the paper. Thus a delay is encountered by the leaf spring while it is cocked with enough force to yank the sprocket wheel 1 along one position. In essence this may be described as a movable member which during its travel cocks a spring member over enough of its movement that the spring attains sufficient energy to move the paper tape advancing sprocket 1 to its next position.

Because of the pivoting of the second degree magnetic lever armature 7 about one end, the amount of motion available for moving pawl 2 is great, while maintaining a close enough magnetic gap in solenoid 12 to afford efficient magnetic force.

Figure 5:
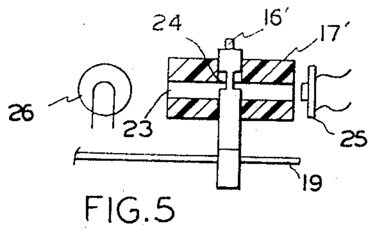
FIGURE 5 is a side view partly in section of a photo-reading embodiment of the invention.

As shown in FIGURE 5, the switching may be accomplished photoelectrically for long term reliability without possibility of mechanical switch contact failures. Thus the pins 16' may have an indented portion 24 which enters bored channel 23 in block 17' to permit light to pass from lamp 26 to photocell block 25 as the pin 16' is held down. The signal for passage of light can be given in either pin position by appropriate positioning of the indented portion 24 of the shaft or other shutter means operated by positioning of pin 16'. The photocell chip 25 may have a series of cells for the respective code positions at the sensing station as seen looking into the drawing, and each corresponding to a separate pin 16' and channel 23.

This mechanism is extremely simple and reliable in operation, since the pins 16 positively sense holes in tape even though chadless tape is used; and thus the photoelectric sensing does not work on a threshold principle sensitive to thin or transparent tape spots, oil drops and the like, but is purely an on-off switch sensitive only to holes properly positioned relative to the sprocket holes.

It is evident therefore that in spite of an extremely simple reader, many advantages accrue over prior art tape readers, and those novel features descriptive of the nature and scope of the invention are defined with particularity in the following claims.

What I claim is:

1. A reciprocally operable punched paper tape reader comprising in combination, a movable member, means moving the member to two limiting positions, retractable sensing pins moved by said member in and out of position for sensing tape holes, a switch contact assembly movable with said pins to two limiting positions to produce signals indicating hole and no-hole tape conditions, a tape advancing sprocket wheel with ratchet teeth thereon, a pawl positioned to engage the ratchet teeth and advance the wheel one tape position for each reciprocation of the movable member, and a spring drive member connected between the pawl and said movable member to constitute a connecting link and disposed to store therein during the travel of said movable member enough energy to pull said pawl against said ratchet teeth and advance the sprocket when the pins are retracted from the tape holes by the movable member.

2. A reader as defined in claim 1 wherein the movable member is an armaturee of an electromagnetically operated device, and a stop assembly is provided holding the armature to produce an intervening air gap in the closed magnetic field position.

3. A reader as defined in claim 1 including a pawl stop pin positioned to limit the terminal position of the pawl as moved by said spring by wedging the pawl into a ratchet tooth position on said sprocket wheel.

4. A simplified punched paper tape reader consisting of a single electromagnetically driven armature having two stable rest positions, a tape advance sprocket, a pawl for driving the sprocket, a spring coupling said pawl and said armature to attain bias and store enough force from said armature while attaining one position to advance the sprocket at least partly from the stored spring bias, and a tape hole sensing assembly with pins adapted to position switching means respectively to indicate the presence and absence of holes, said sensing assembly being movable into two positions by said armature with movement of said armature to said two positions to permit the pins to respectively contact and clear the punched paper tape in the two positions.

5. A reader as defined in claim 4, wherein the movable member is a second degree lever pivoted at one end, having an intermediate gap with the electromagnet, and having the spring coupled at a position remote from the gap.

6 A reader as defined in claim 4, wherein the switching means comprises photoelectric sensing means and a shutter mechanism therefore operable by positioning of said pins.

7. A simplified paper tape advancing mechanism with a pawl and a ratchet mechanism comprising a single movable armature, a spring member constituting the sole linkage between the armature and said pawl and means to permit movement of said armature to a limiting position to store in said spring a force to be exerted on the pawl by said spring to advance said ratchet mechanism after the armature is moved to said limiting position.

8. A paper tape advancing mechanism including a movable driving member comprising an electromagnetic armature movable to two limiting positions, a set of retractable pins for sensing tape codes moved by said member between two limiting positions against the tape and away from the tape, a ratcheting mechanism and a drive spring link member disposed between said armature and the ratcheting mechanism and having a pawl thereon so that the spring is cocked by said movable member in one limiting position as the pins are drawn away from the tape to exert a ratcheting force on said mechanism after the armature is moved to the corresponding limiting position.

9. A mechanism as defined in claim 8 wherein pin position sensing means is provided in the form of electrical contacts and an armature moved with said pins.

10. A mechanism as defined in claim 8 wherein pin position sensing means is provided in the form of a light source, photo responsive means and a shutter between the source and photo means operable by positioning of the pins to give a signal representive of the data sensed in the form of holes in the paper tape.

11. A positive acting paper tape hole sensing system incorporating photoreading, comprising in combination, tape advancing means including a ratcheting mechanism for positioning tape code positions at a predetermined sensing station, means positioning a plurality of movable pins at the respective code positions at said station in one of two extreme positions dependent upon the presence and absence of a hole in the tape at said code positions, a radiant energy source, radiant energy responsive means, and shutter means interposed between said source and responsive means to intercept the radiant energy at one of said extreme positions of said pins and transmit the radiant energy at the other of said extreme positions of said pins.

References Cited

UNITED STATES PATENTS

| | | | |
|---|---|---|---|
| 1,586,965 | 6/1926 | Clokey | 178—3 |
| 1,910,586 | 5/1933 | Bartholomew et al. | 235—61.113 X |
| 2,619,532 | 11/1952 | Blodgett | 235—61.11 |
| 2,667,535 | 11/1954 | Slayton | 178—17 |
| 2,762,931 | 9/1956 | Schewe | 250—219 |
| 2,905,298 | 9/1959 | Blodgett et al. | 235—61.11 X |
| 3,201,570 | 8/1965 | Perez et al. | 235—61.11 |
| 3,201,571 | 8/1965 | Gryk | 235—61.11 |

DARYL W. COOK, *Primary Examiner.*

ROBERT M. KILGORE, *Assistant Examiner.*

U.S. Cl. X.R.

226—157.